United States Patent [19]
Neese

[11] 3,941,575
[45] Mar. 2, 1976

[54] MULTI-ELEMENT REED CAPSULE SEALING APPARATUS AND METHOD FOR MAKING

[75] Inventor: Wayne E. Neese, Hoffman Estates, Ill.

[73] Assignee: GTE Automatic Electric Laboratories Incorporated, Northlake, Ill.

[22] Filed: Apr. 24, 1974

[21] Appl. No.: 463,478

[52] U.S. Cl.................. 65/59 A; 65/139; 29/25.13; 29/25.16; 29/25.2
[51] Int. Cl.²......................................... C03C 27/02
[58] Field of Search....... 65/138, 139, 59; 29/25.13, 29/25.16, 25.2; 279/117

[56] References Cited
UNITED STATES PATENTS

| | | | |
|---|---|---|---|
| 2,590,509 | 3/1952 | Church | 279/117 |
| 3,203,081 | 8/1965 | Reck | 65/138 UX |
| 3,537,276 | 11/1970 | Pityo | 65/59 |
| 3,595,594 | 7/1971 | Aronson | 279/117 |
| 3,716,285 | 2/1973 | Boyce | 65/138 X |

*Primary Examiner*—Arthur D. Kellogg

[57] ABSTRACT

A machine for assembling the plural contact pairs of a multi-element reed capsule switch inside of a glass envelope and maintaining the overall assembly in alignment while the glass envelope is heated and sealed around the terminal ends of the contact pairs. Plural pairs of the reed switch contact members and the glass envelope are manually assembled into intermediate loading fixtures. The machine then automatically transfers the contact members and glass envelope to chucks for maintaining them in correct alignment; the chucks position the contact members inside of the glass envelope; the machine pressure chamber closes and is rapidly evacuated of atmosphere, flushed, and pressurized with an inert gas and the glass sealed about the contacts all while maintaining the correct alignment.

12 Claims, 23 Drawing Figures

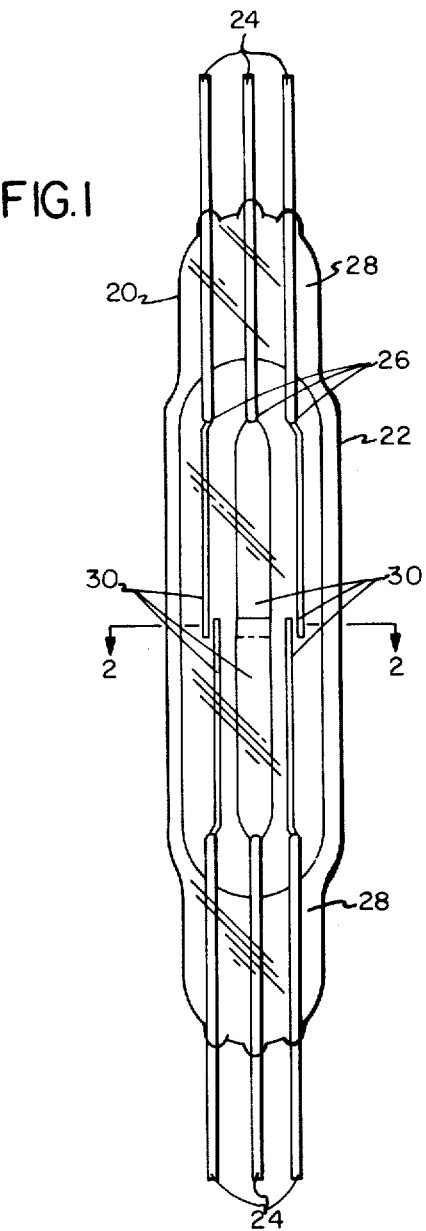
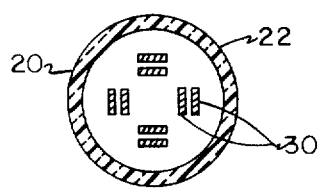

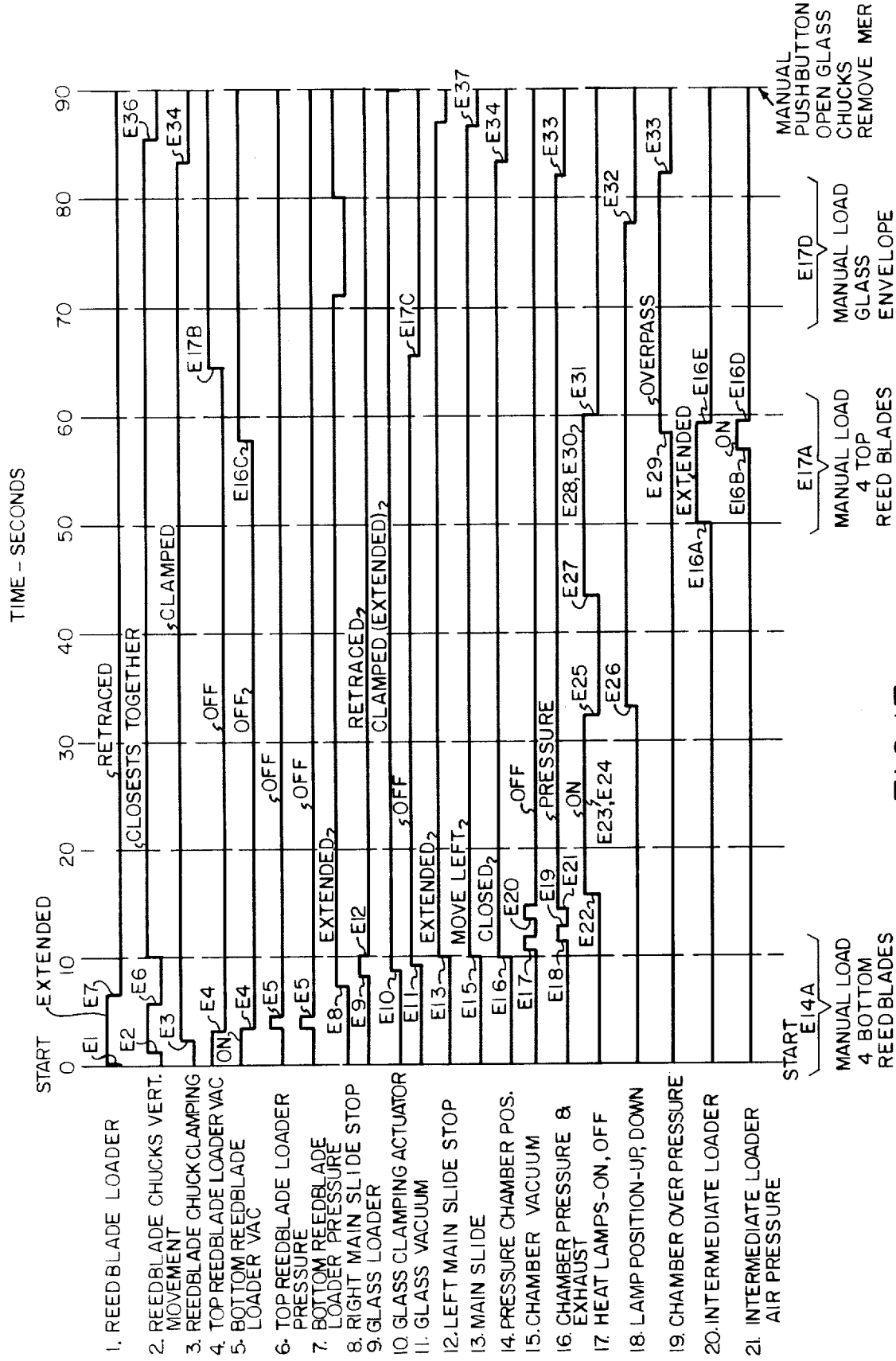

3,941,575

MULTI-ELEMENT REED CAPSULE SEALING APPARATUS AND METHOD FOR MAKING

BACKGROUND OF THE INVENTION

The field of the invention is generally related to the fabrication of reed switches. More particularly, the invention relates to a machine and methods for semi-automatically assembling and sealing in correct alignment inside a glass envelope the plural contact pairs of a multi-element reed capsule.

In multi-element reed switches, plural pairs of magnetizable switch contact members are positioned in overlapping spaced relationship within a non-magnetizable envelope which most frequently is glass. The switch contacts are opened or closed through the selective application of a controlled magnetic field. Switches of this general type are well known and are used by the hundreds of thousands in telephone and other switching networks. Because of the large quantities needed, it is desirable that the final assembly of the switch contacts inside the envelope be made rapidly and that minimum variations in contact characteristics be maintained. One manner of achieving these goals is through machine assembly which is both faster than manual assembly and also more repeatable than manual operations. However, maintaining the precise alignments required all through the assembly and sealing process has proven difficult to achieve in a fast consistent manner. Some manual adjustment of alignment after assembly has been required or, a generally unsatisfactory rejection rate encountered.

Means are known in the prior art for facilitating the automatic manufacture of reed switches including in at least a conceptual sense a number of the basic steps and methods of this invention, but the prior art is lacking in a number of the refinements found necessary if automatic high-speed assembly with high quality dimensionally accurate assemblies are to be achieved. Thus the patents of Pityo, U.S. Pat. No. 3,537,276 and Reck, U.S. Pat. No. 3,203,081 are both directed to automatic assembly of reed switches but not, multi-element reed switches as with the invention.

SUMMARY OF THE INVENTION

The invention includes a station for loading of the plural pairs of reed contact members and a glass cylinder in an intermediate fixture exterior of the fabricating area. These elements are then transferred to the reedblade and glass chucks inside the fabricating area. The intermediate fixture then retracts and returns to the loading station. In a continuing cycle, one set of contact reedblades is positioned within the glass envelope extending outwardly from one end of the envelope and simultaneously the mating set is positioned in complementary fashion extending outward the other end. This positioning establishes both contact pair overlap and gap and, the chucks maintain these characteristics throughout the subsequent sealing process. A pressure chamber closes around the assembled elements, evacuated, flushed, and pressurized with an inert gas. The chamber is pressurized and the assembly then sealed by infrared energy — first at one end and then the other. Following this, the pressure chamber is opened, the reedblade chucks release the blades and move away form the assembly and the completed switch removed. The cycle is then repeated.

BRIEF DESCRIPTION OF THE DRAWINGS

FIG. 1 is a side view of a multi-element reed capsule switch of the type the invention is designed to automatically fabricate;

FIG. 2 is a section taken at 2—2 in FIG. 1;

FIG. 17 illustrates in graphical form the sequence of machine operations and their interrelation.

DESCRIPTION OF THE PREFERRED EMBODIMENT

Figure 3:
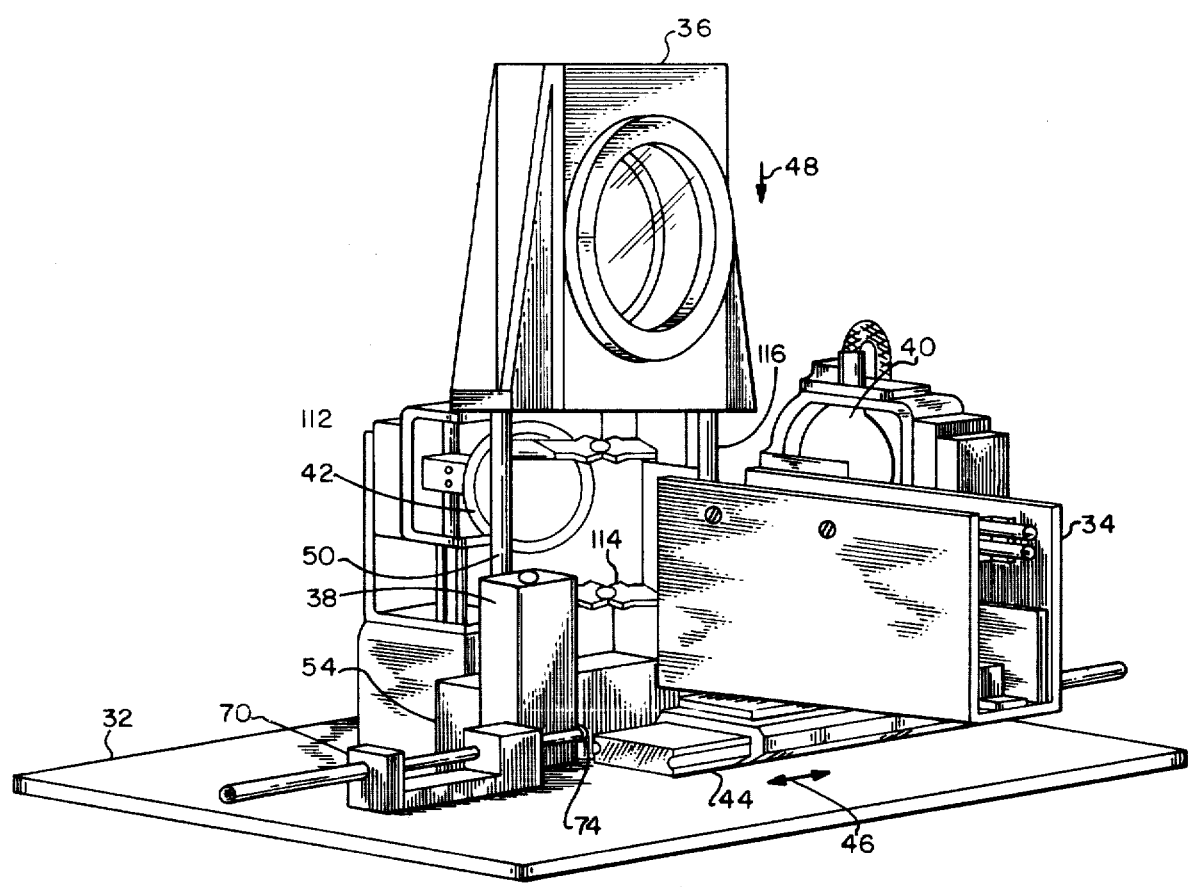
FIG. 3 is a simplified front perspective view of the principal machine components.

FIGS. 1 and 2 illustrate the appearance of a reed switch 20 of the general type fabricated using the inventive apparatus and method. A generally tubular glass envelope 22 has had both of its ends melted around terminal shanks 24 of reedblades 26 to obtain seal areas 28. The seal areas form a hermetic enclosure for the switch blades 30 which are an integral part of reedblades 26. The enclosed volume is typically filled with an inert gas, such as nitrogen, to improve the reliability and lengthen the life of the switch contact pairs. This type of switch is well known and is used in great quantities in switching networks.

Figure 4:
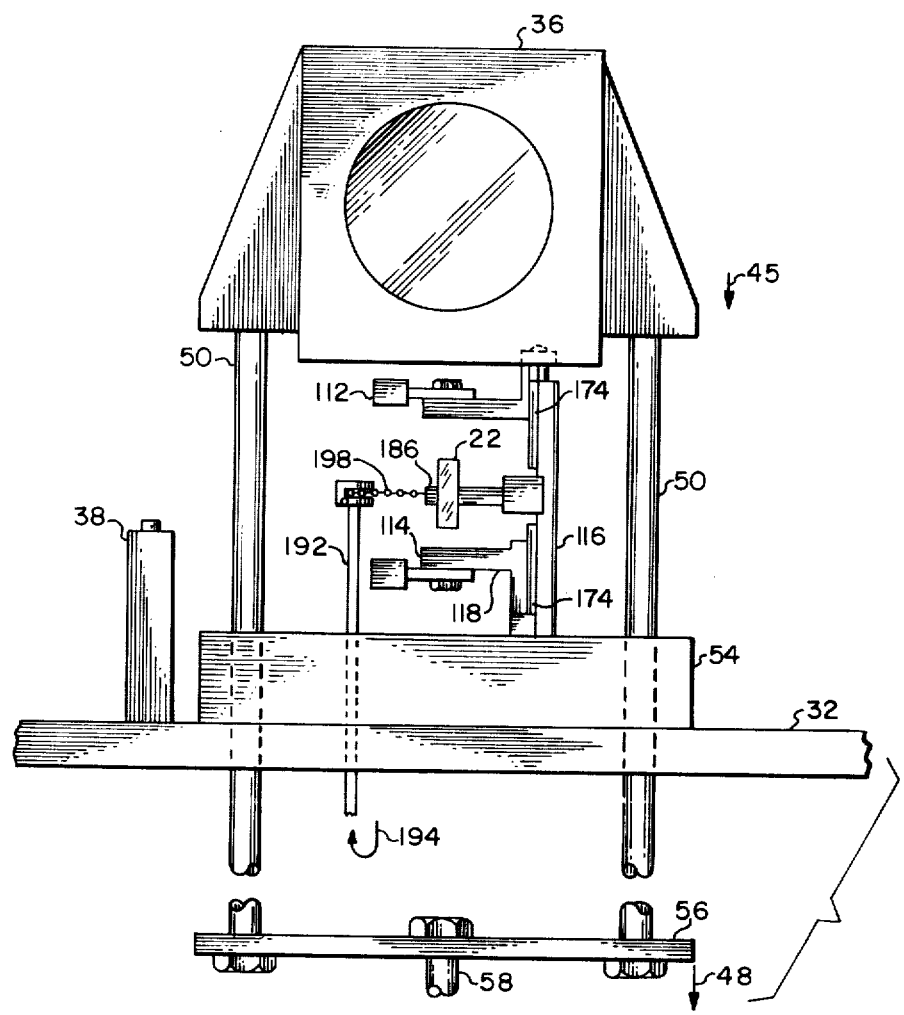
FIG. 4 is a front elevation of the fabricating area of the machine with the exterior intermediate reedblade and glass cylinder loader removed.
Figure 5:
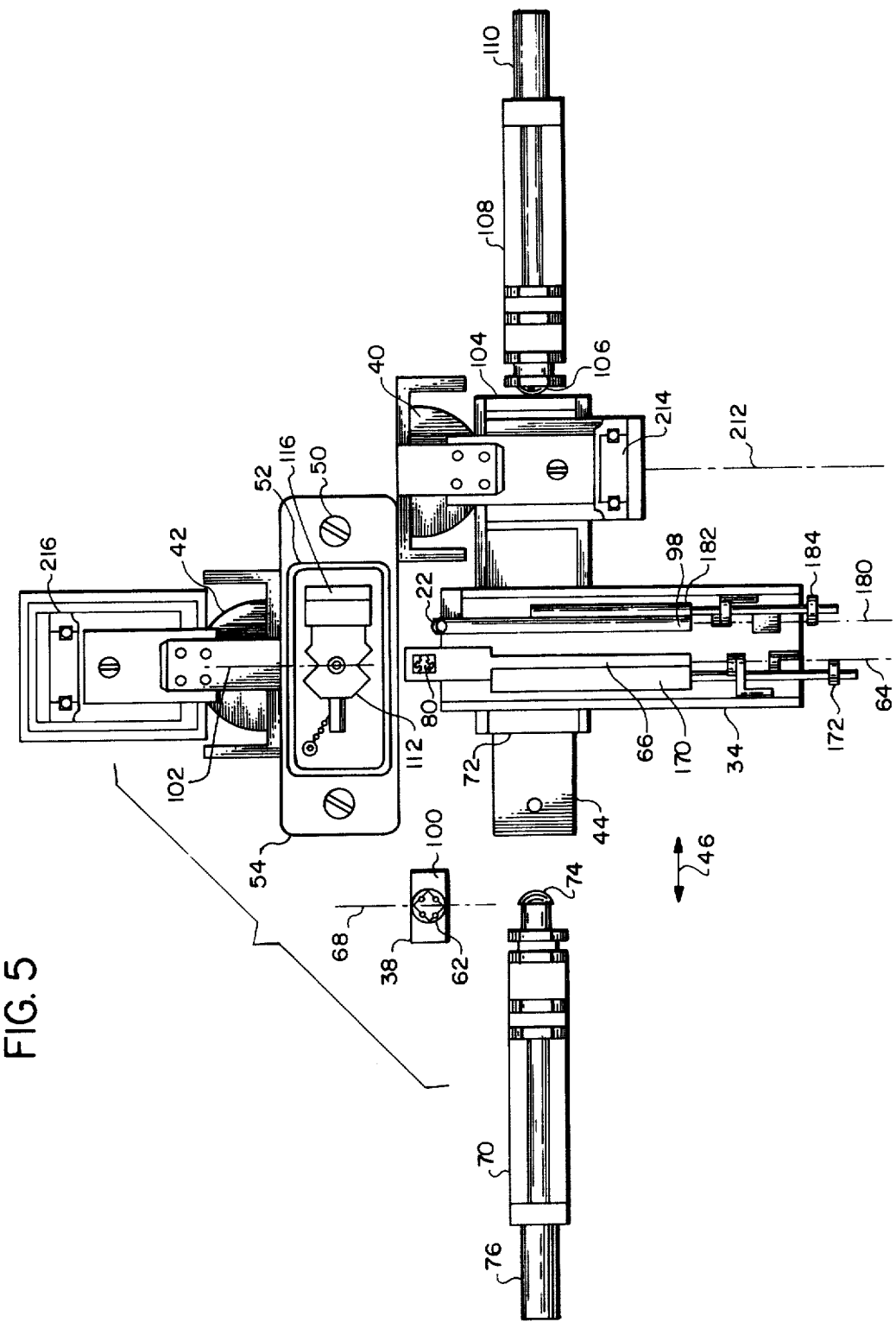
FIG. 5 is a top view of the principal machine components but with the pressure chamber removed.

FIGS. 3, 4 and 5 illustrate the basic components of the machine. In each of the drawings certain details have been omitted to improve the clarity of the drawing presentation. A base plate 32 supports the principal machine components including a laterally movable loader transfer arm support 34, a vertically movable pressure chamber assembly 36, bottom reedblade transfer fixture 38, and front 40 and rear 42 infrared heat sources. The loader transfer arm support is secured to and is movable with main slide 44 in the direction of double arrow 46.

Pressure chamber 36 is shown in its uppermost position in FIGS. 3 and 4 and is movable from this position downward, in the direction of arrow 48, by actuator rods 50 to which it is secured. The pressure chamber is maintained in its uppermost position while the reedblades and glass envelopes are assembled into their respective chucks and later, while the completed reed switch is removed. The pressure chamber is lowered over the chucked reedblades and glass envelopes to a closed chamber position achieved when it makes sealing contact with an O ring 52 mounted in a head base 54. The chamber is maintained in its lowered position and evacuated, flushed and pressurized with an inert gas during the interval that the two infrared heat sources effect the sealing of the glass envelope about the terminal shanks of the reedblades. Lowering of the pressure chamber is effected by a yoke 56 secured to the actuator rods and by a double acting air cylinder 58, a portion of whose ram is shown.

Assembly of the reed switch commences with an operator manually assembling four reedblades 26, terminal ends down, into the four slots formed in the top of the preloader guide bushing 62 which is secured on the top of bottom reedblade transfer fixture 38. Loader transfer arm support 34 is moved on slide 44 to the left from the position shown in FIG. 5 to a position where the centerline 64 of the reedblade loader arm assembly 66 is aligned with the center line 68 of preloader guide bushing 62. The main slide and loader transfer arm support are moved by the action of a main slide air cylinder (not shown). When the slide is moved to the left, its left end 72 contacts the stop button 74 on left slide stop assembly 70. At that point air cylinder 76 retracts stop button 74 cushioning the impact of the slide on the stop button. Stop button 74 is shown in its extended position in FIGS. 3 and 5.

Figure 7:
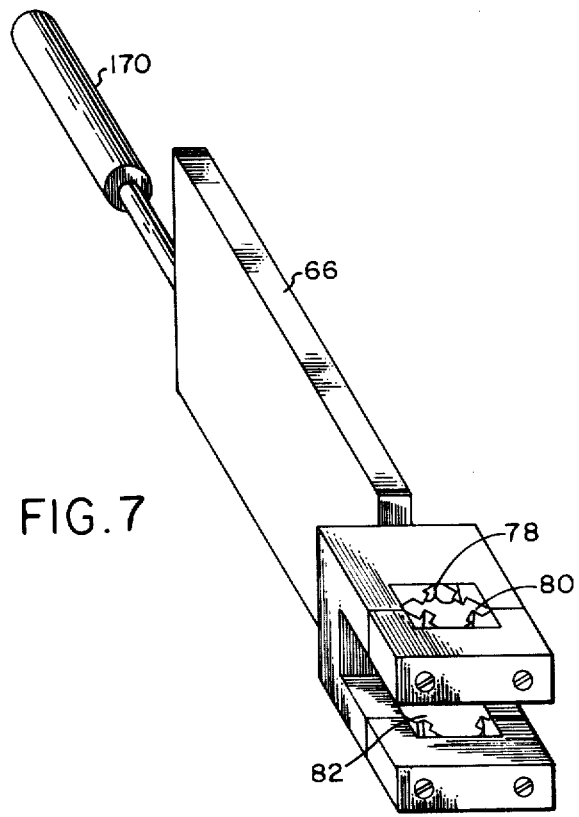
FIG. 7 is a perspective view of the reedblade intermediate loader arm.

With the centerlines of the reedblade loader arm assembly and the bottom reedblade transfer fixture aligned, the operator loads the four top reedblades, blade ends down, into the slots 78 of the chuck 80 on the top of the loader arm assembly 66 as shown in FIG. 7. While the operator is loading the four top reedblades, the bottom four which had previously been assembled into the slots in the bottom reedblade transfer fixture 38, are being transferred automatically to the bottom intermediate arm blade holding chuck 82. This automatic transfer sequence is illustrated for one pair of reedblades in FIG. 9.

Figure 6:
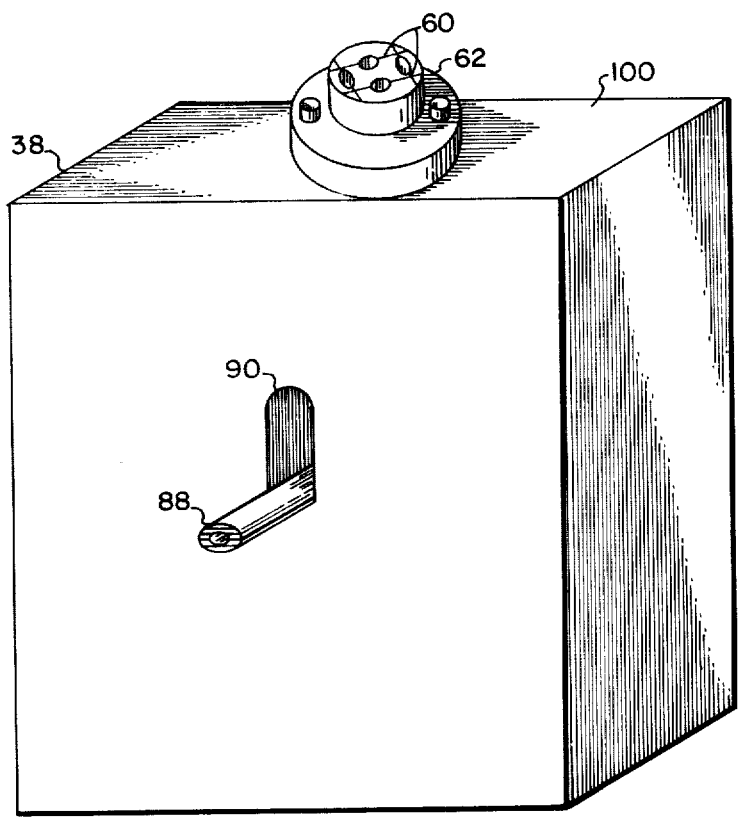
FIG. 6 is a perspective view of the bottom reedblade transfer fixture.
Figure 9A:
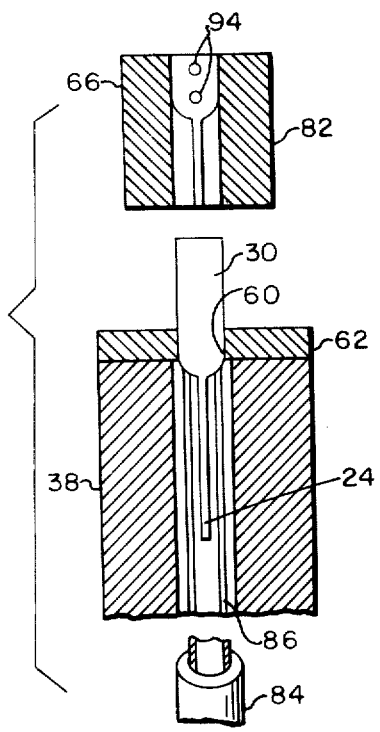
FIGS. 9A, 9B and 9C illustrate the loading sequence of the reedblades into the reedblade intermediate loader arm from the bottom reedblade transfer fixture.
Figure 9B:
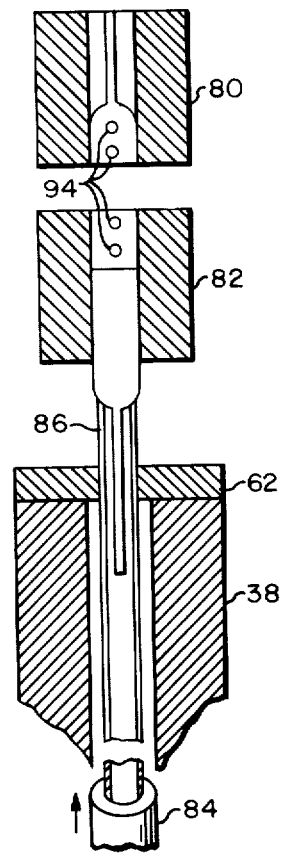
Figure 9C:
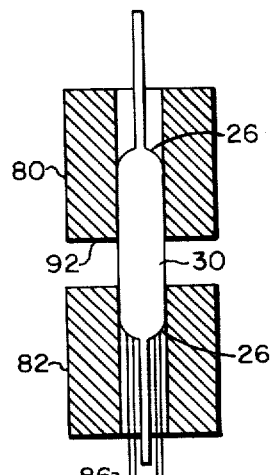
Figure 10:
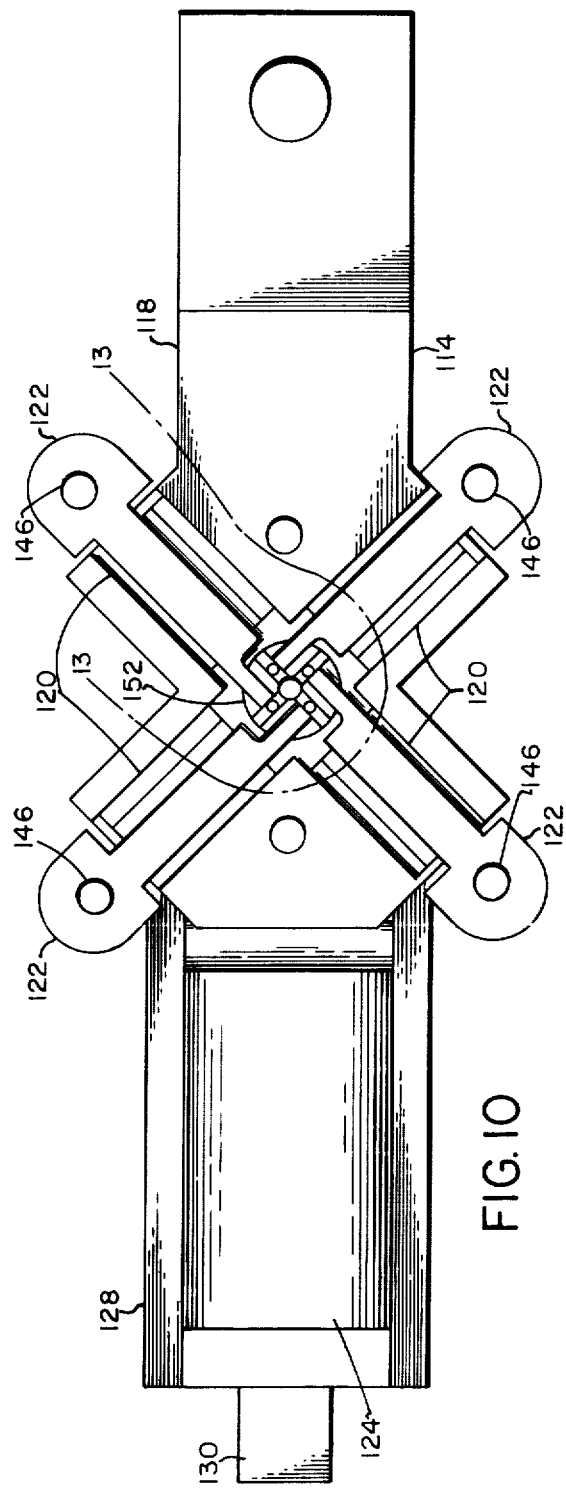
FIG. 10 is a top view of the reedblade holding chuck of the invention.
Figure 12:
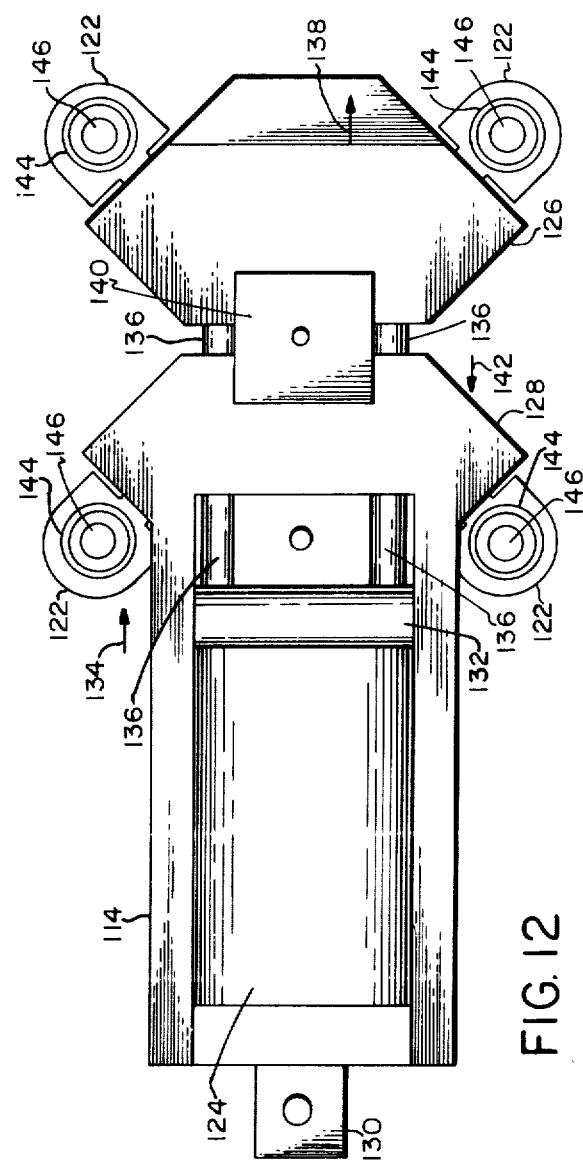
FIG. 12 is a bottom view of the reedblade chuck.
Figure 11:
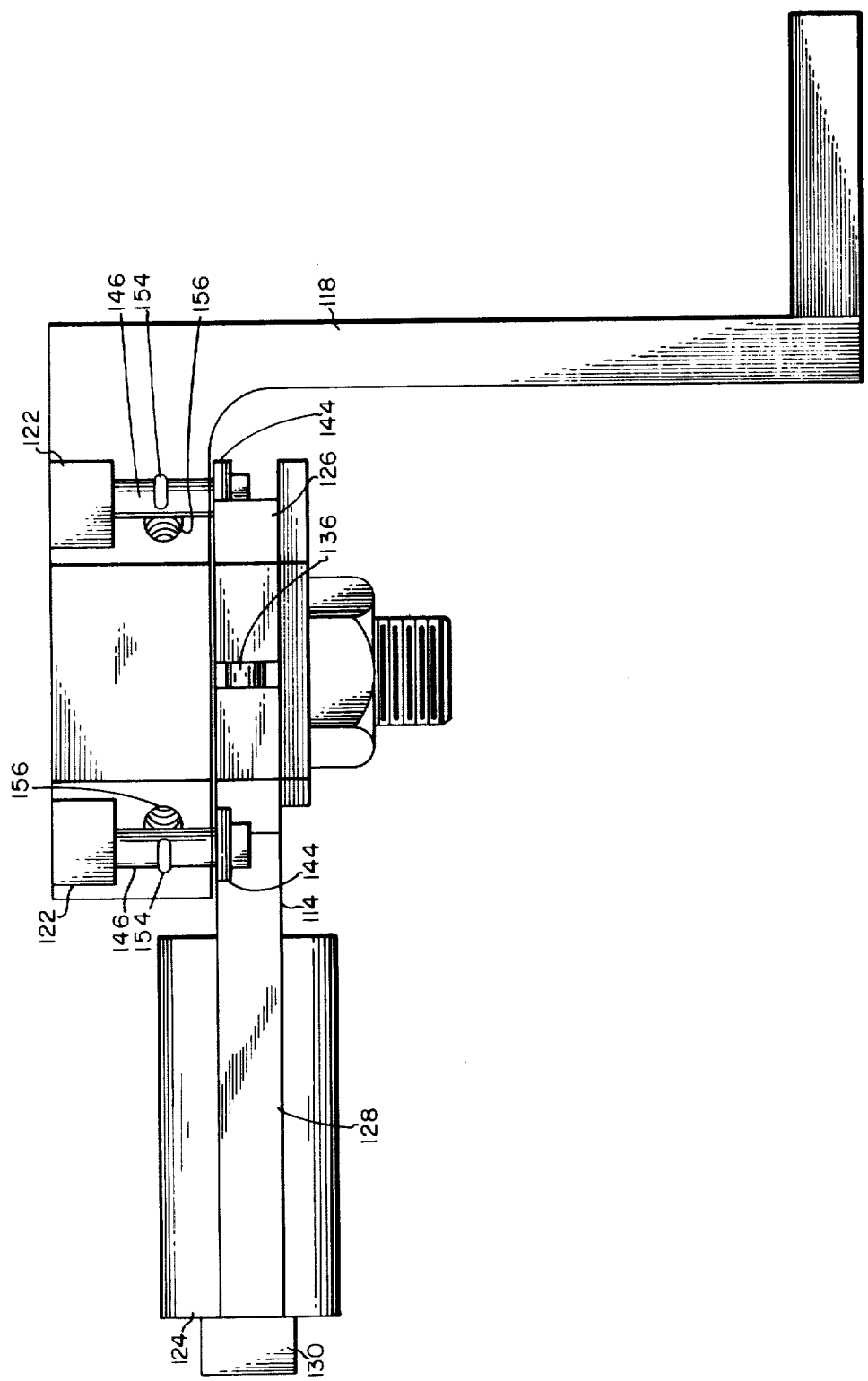
FIG. 11 is a side view of the reedblade chuck.

In FIG. 9A the reedblades 26 have been loaded into the bottom reedblade transfer fixture 38 and the reedblade loader arm assembly 66 positioned directly over it. In FIG. 9B, an air cylinder 84 connected to the four hollow guide pins 86 raises the pins to the position shown. The reedblades are carried with the guide pins and partially enter the bottom intermediate arm blade holding chuck 82. The blade raising action of air cylinder 84 continues until actuator cylinder guide 88 contacts the top end 90 of the slot in the side of the bottom reedblade transfer fixture 38 (FIG. 6). The air cylinder is not used to fully raise the reedblades since, if this were done, any variation in the length of the reedblades would either cause a variation in their chucked position or, by forcing them against a stop cause some deformation.

Figure 8:
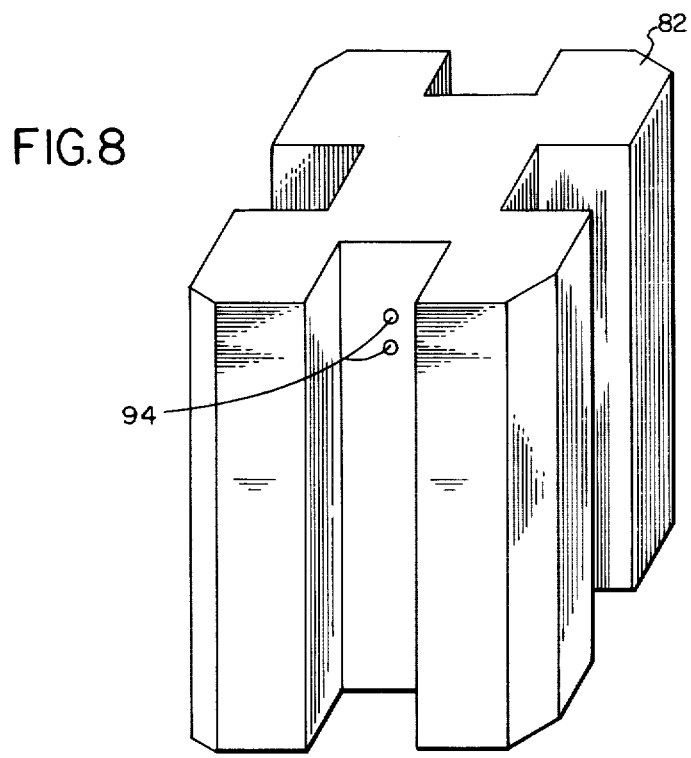
FIG. 8 is a perspective view of the bottom intermediate arm reedblade holding chuck.

After the reedblades are raised to the position shown in FIG. 9B, low pressure air is directed through actuator cylinder guide 88 and thence upwardly in the direction of arrow 96 through hollow guide pins 86. This gently lifts the reedblades until they reach the position shown in FIG. 9C where the switch blades 30 and terminal shanks are aligned with a recess for receiving them in bottom chuck 82 and where the top edge of the switch blades contacts the bottom surface of the top chuck 80. The distance between top and bottom chucks 80 and 82 has been exaggerated in FIGS. 7 and 9 to facilitate illustration. The recess for receiving the reedblades is best shown in FIG. 8. When the reedblades reach their final position, a vacuum is applied to them through ports 94 in the top and bottom intermediate arm blade holding chucks, 80 and 82, respectively. The applied vacuum retains the reedblades in position until they are transferred to the reedblade chucks used to hold them during final assembly. After the reedblades are secured in position by the vacuum, air cylinder 84 and guide pins 86 are retracted and the low air pressure through the guide pins is shut off.

While the main slide 44 and loader transfer arm support 34 are in their far left position and after loading of the eight reedblades, the operator manually loads a glass envelope 22. The envelope is positioned in line with the curved end of glass loader transfer arm 98 and resting upon the top surface 100 of bottom reedblade transfer fixture 38. An applied vacuum at the curved end of arm 98 retains the glass envelope in alignment therewith.

The main slide 44 and loader transfer arm are now moved to the right toward a position where the centerline 64 of reedblade loader arm assembly 66 will be aligned with the machine main centerline 102 as shown in FIG. 5. As the slide moves to the right, its right end 104 contacts the stop button 106 on right slide stop assembly 108. At that point air cylinder 110 retracts stop button 106 cushioning the impact of the slide on the stop button. The loader transfer arm support is now positioned to permit the transfer of the eight reedblades held in its loader arm assembly 66 to the two reedblade chucks that will hold them during final assembly of the reed switch. Since an understanding of the construction and operation of the reedblade chucks will facilitate understanding of the transfer operation, this is described next.

The sealing machine has an upper and a lower reedblade chuck assembly for holding the reedblades during final assembly of the reed switch. Both the upper, 112, and the lower, 114, chuck assemblies are mounted upon a support post assembly 116. Since the two reedblade chucks are substantially identical, only one will be described.

Figure 13:
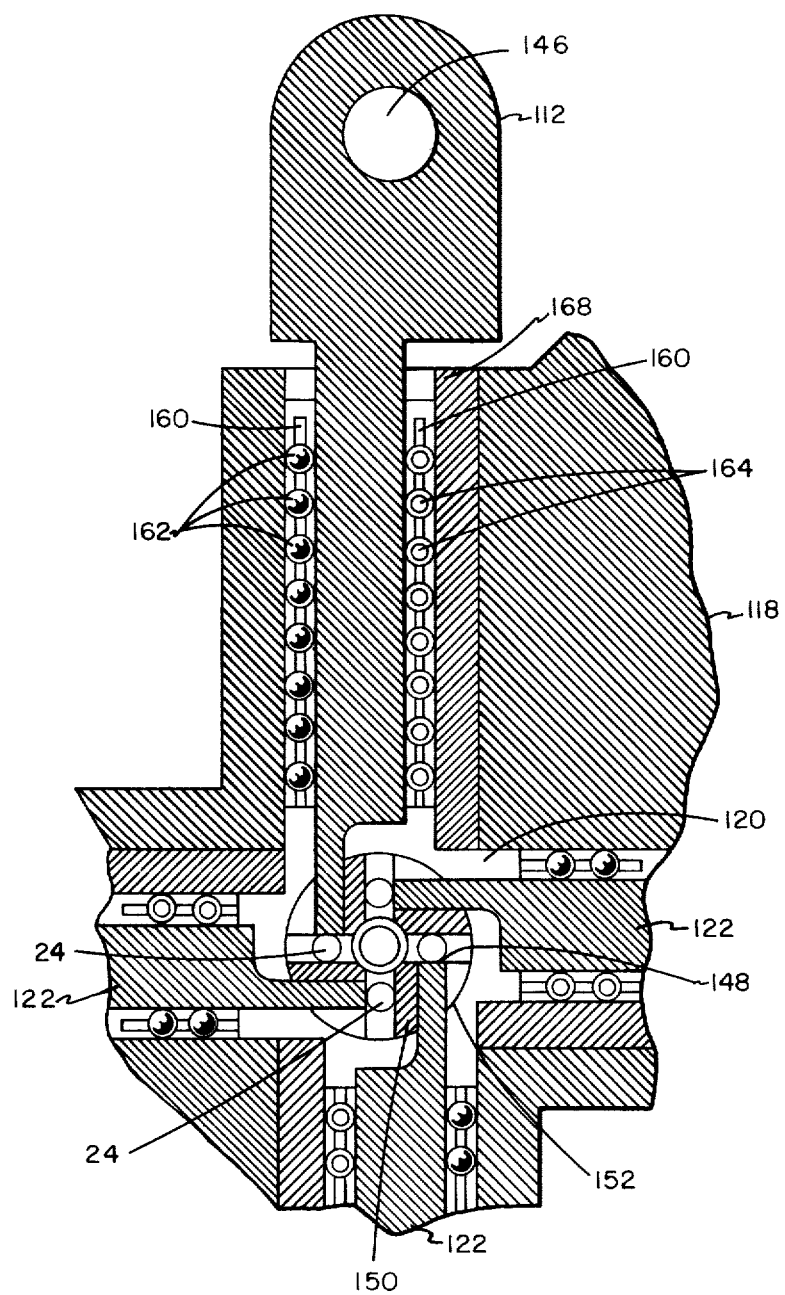
FIG. 13 is an enlarged view of a portion of FIG. 10 showing details of the reedblade chuck and its manner of holding the reedblades.
Figure 14A:
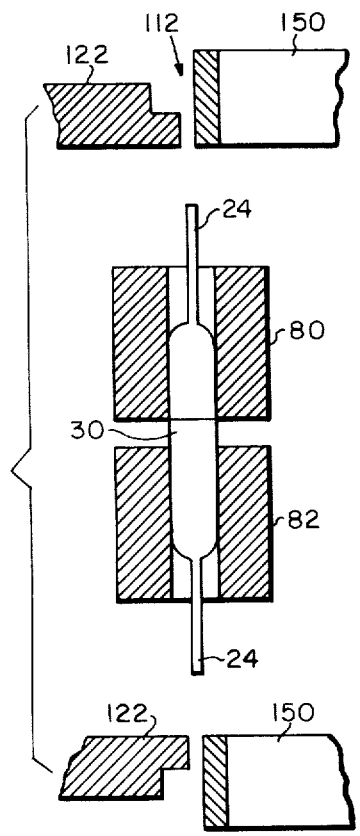
FIGS. 14A, 14B and 14C show the sequence of operations involved in the transfer of reedblades from the intermediate loader arm to the reedblade chuck assemblies.
Figure 14B:
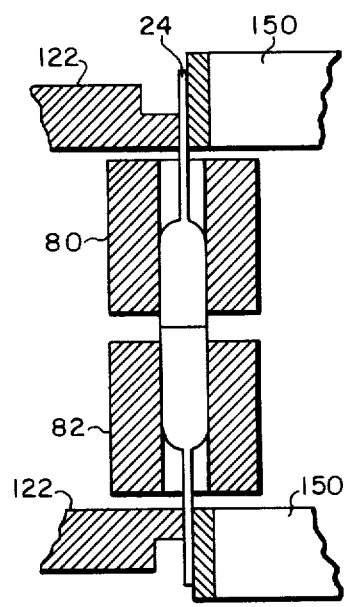
Figure 14C:
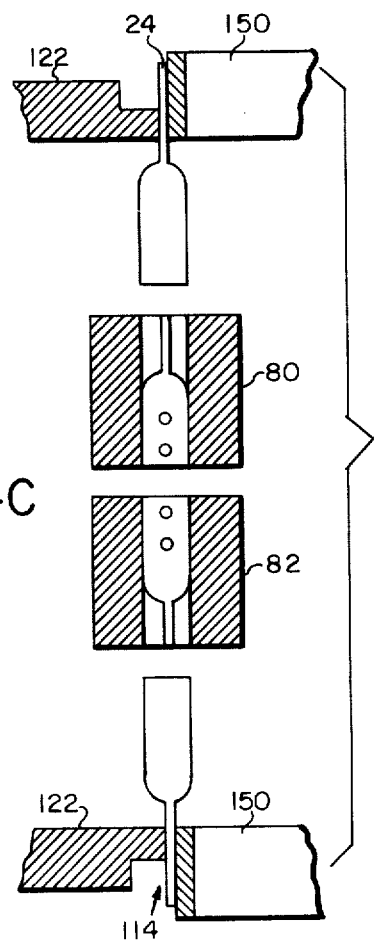

The construction of the lower reedblade chuck 114 is illustrated in FIGS. 10–13 and the sequence of operations involved in the transfer of the reedblades from the loader transfer arm to the two reedblade chucks is illustrated in FIGS. 14A–C. Cover plates have not been shown in FIGS. 10 and 12 to clarify operation and FIG. 13 is an enlarged view of the portion of FIG. 10 taken at 13—13.

Each of the reedblade chuck assemblies, upper as well as lower, is held and supported by a base 118 which is, in turn, secured to the support post assembly 116. The base is also a structural part of the chuck assembly providing guides for the reciprocating motion of clamp slides as they alternately open and close on the terminal shank portions 24 of each of the reedblades 26. Thus, base 118 contains two guide slots 120 intersecting each other at a 90° angle in which slots clamp slides 122 reciprocate.

The reciprocation of clamp slides 122 to clamp the reedblade terminal ends is achieved by air cylinder 124 acting upon a right and left slide actuator, 126 and 128 respectively. Left slide actuator 128 in addition to its actuating function, also acts as a support for air cylinder 124 and its inlet connector 130. When air is applied to air cylinder 124, cylinder actuator 132 is moved in the direction of arrow 134 carrying with it two guide rods 136 which are journaled in left slide actuator 128 and secured to right side actuator 126. This causes right side actuator 126 to move outward in the direction of arrow 138 guided by the square section 140 of base 118 and left side actuator 128 to also move outward in the direction of arrow 142, guided by the same square section 140.

As the left and right side actuators move outward they push on bearings 144 which are carried on bearing pins 146 which are each, in turn, secured to clamp sides 122. Thus, the clamp slides are also moved outward increasing the clearance between their tips 148 and clamp pins 150 into which the terminal ends 24 of the reedblades fit. Clamp pins 150 are secured in a round recess 152 in base 118 by a roll pin 158. The unclamping outward movements of clamp slides 122 are individually restrained by tension springs 154. The hidden ends of tension springs 154 are anchored to pins (not shown) positioned in the bored holes 156 in base 118 into which the springs extend. Then, when air to cylinder 124 is released the springs 154 restore clamp slides 122 to their closed or clamping position. This is advantageous since no energy is expended in holding the reedblades in their clamped position. Another advantageous feature of having springs maintain the clamp slides 122 in their clamped position is that there is no physical linkage between the air cylinder 124 and slides 122. Thus, the pressure on each slide can be accurately adjusted to make it uniform on all reedblade terminals 24.

As can be appreciated, the reed members 26 must be maintained in very exact position during the sealing operation and, there must be no appreciable rotation when they are clamped into the reedblade chucks. Since any lateral movement of clamp slides 122 would result in such rotation, it is necessary to prevent such rotation while simultaneously permitting free reciprocation of the slides. It is an advantageous feature of the invention that both lateral movement prevention and free reciprocation are achieved through the use of the novel roller bearings best shown in FIG. 13.

As shown in FIG. 13, a novel roller bearing construction permits more preloading than can ordinarily be achieved and this preloading prevents lateral movement of the slides. The novel construction, however, still permits the necessary free slide movement which would ordinarily be hindered by the extent of the preloading employed. This is accomplished by using a conventional roller bearing comprising a bearing cage 160 and plural conventional rollers 162 on one side of slide 122. Then on the opposite side of the slide there is inserted between the slide and a shim 168, a novel bearing comprising a bearing cage 160 and tubular rollers 164. The tubular structure of rollers 164 allows them to deform to an imperceptably oval shape as they are fitted into a space slightly narrower than their normal outside diameter. Not only does this prevent lateral movement of the slides and permits free reciprocation, it automatically compensates for any wear or expansion and contraction of slides 122.

From the foregoing, the manner of operation of the reedblade chuck assemblies can be seen as well as the many novel features of their construction. Intentionally, there has been a minimum of discussion concerning fasteners, cover plates and other elements whose function is believed to be clear from the drawing presentation.

When the reedblade loader arm assembly 66 was moved to the right to align it with the machine centerline, the upper and lower reedblade chuck assemblies were being held in their highest and lowest positions, respectively. In this position, when reedblade loader arm assembly 66 is moved into the machine work area by air cylinder 170, the terminal shanks 24 of the reed members 26 fixtured in its chucks 80 and 82 clear the reedblade chuck assemblies. An adjustable stop 172 permits accurate adjustment of loader arm assembly travel so that the vertical centerline of chucks 80 and 82 is coincident with the vertical centerline of the two reedblade chuck assemblies 112 and 114. This is the position shown in FIG. 14A wherein only the clamp slides 122 and clamp pins 150 of the reedblade chuck assemblies are shown. Both the upper and lower reedblade chuck assemblies are secured to support post 116 by linear bearings 174. Air cylinder operated push rods within the support post control the raising and lowering of the reedblade chuck assemblies. The rod for actuation of upper chuck assembly 112 is shown at 176 in FIG. 4. The air cylinder 178 and hollow rod used to actuate the lower reedblade chuck assembly have not been shown in order to simplify the drawing presentation since they are conventional in nature.

After positioning of the reed members in alignment with the reedblade chuck assemblies, air cylinder 178 is actuated to move the chuck assemblies together to come to rest against their innermost stops on support post assembly 116. In this position that chucks inner surfaces are then substantially equidistant from the horizontal centerline of the reed members 26 as fixtured in chucks 80 and 82 of reedblade loader arm assembly 66. The terminal shanks 24 of the reed members 26 are positioned in the slots formed when clamp slides 122 are in the open position.

When the terminal shanks 24 of reed members 26 are in position in their respective slots of the reedblade chuck assemblies, the chuck assemblies air cylinder is deactivated to clamp the shanks 24. This is the position shown in FIG. 14B. Thereafter, the vacuum that had been holding the reed members in the chucks 80 and 82 of loader arm assembly 66 is replaced by low air pressure releasing the reed members and cushioning them to prevent abrading against chucks 80 and 82. Air cylinder 178 is then activated to move the reedblade chuck assemblies 112 and 114 apart to clear the main loading fixture. See FIG. 14C. Air cylinder 170 is then activated to retract reedblade loader arm assembly 66 from the sealing area of the machine.

The next event in the sequence of machine operation is the movement of the loader transfer arm support 34 a short distance to the left to bring the centerline 180 of glass loader transfer arm 98 into alignment with the machines main centerline 102. It is an advantageous feature of the invention that selective actuation of right slide stop assembly 108 can be used to effect this differential movement. Air pressure in cylinder 110 is increased until it is greater than that applied to the main slide air cylinder (not shown) and which had moved loader transfer arm 34 to its rightmost position as shown in FIG. 5. This differential in pressure between the main slide air cylinder and air cylinder 110 causes loader transfer arm 34 to move to the left until a stop in slide stop assembly 108 is reached. At this point centerline 180 and 102 are aligned.

Figure 15:
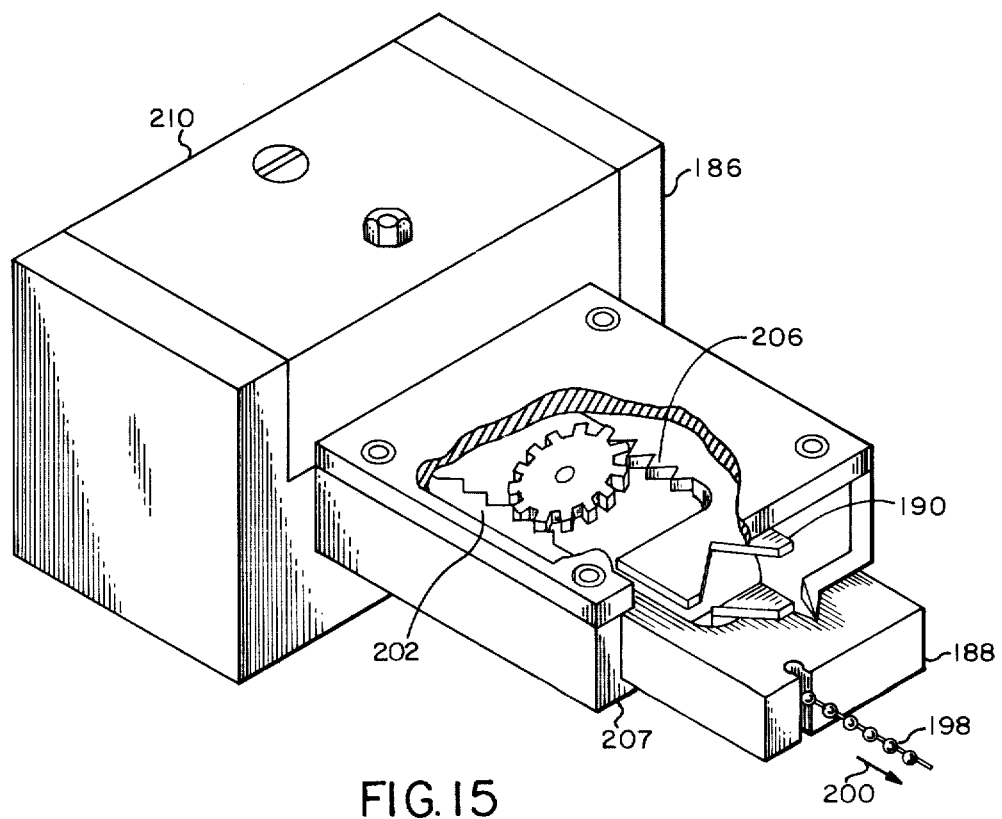
FIG. 15 is a perspective view, with parts cut-away, illustrating the glass envelope chuck of the invention.

Air cylinder 182 is then actuated to move the glass loader transfer arm 98 into the machine sealing area. A stop 184 limits movement to that necessary to align the vertical centerline of the glass envelope 22 at the end of arm 98 with the vertical centerline of glass chuck assembly 186. Glass chuck assembly is non-movably secured to support post assembly 116 and is shown, partly in section, in FIG. 15.

Glass chuck assembly 186 is of the self-centering type; that is, it will maintain the vertical centerline of the glass envelope 22 on the machine centerline irrespective of outside diameter variations in the envelope. At the end of the last previous machine cycle and prior to movement of glass loader transfer arm 98 into the sealing area, the left and right glass chucks, 188 and 190 respectively, of the chuck assembly 186 were opened to release the last completed reed switch. In the open position there is no interference with movement of the loaded glass loader transfer arm. Opening of the glass chuck assembly is effected by a glass chuck air cylinder (not shown) but below the machine base plate 32 and acting on a bell crank (also not shown) to effect rotation of glass chuck actuator rod 192 and pulley 194 in the direction of arrow 196. This winds up bead chain 198 moving left glass chuck 188 in the direction of arrow 200 toward the open position. Left glass chuck 188 carries a rack segment 202 which meshes with pinion gear 204 which in turn, meshes with rack segment 206 carried by right glass chuck 190. Because of this gear train, as left glass chuck 188 is pulled in the direction of arrow 200, right glass chuck is driven an equal distance in the opposite direction further opening the glass chuck assembly 186.

Left and right glass chucks 188 and 190 are maintained in alignment with each other by glass chuck mounting block 207, pinion gear 204 and a roller bearing (not shown) positioned between them and rotatable about cap screw 208 secured between retainer block 210 and block 207. As left glass chuck 188 is moved in the direction of arrow 200 toward the open position, an extension spring (not shown) connected between chuck 188 and support post assembly 116 is extended. Thus, when the glass chuck air cylinder is deenergized the extension spring will move glass chucks 188 and 190 toward each other to clamp glass envelope 22 in the position shown in FIG. 16A.

Figure 16A:
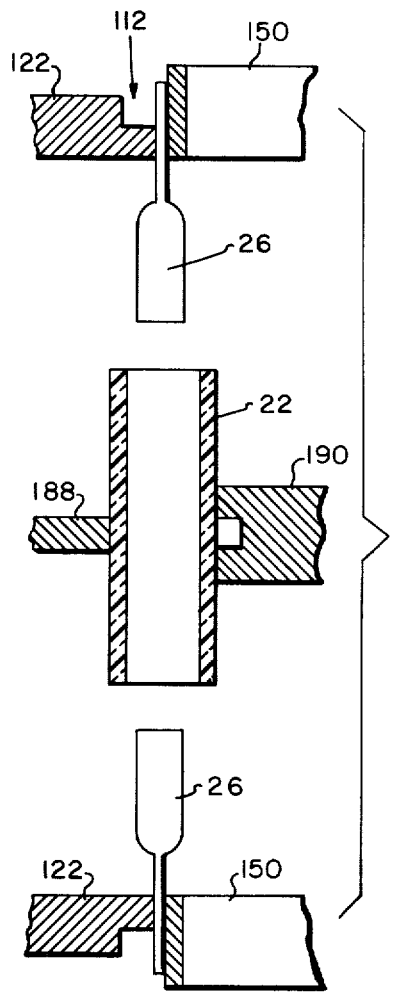
FIGS. 16A, 16B and 16C illustrate the sequence of operations involved in the assembly of the chucked reedblades into the glass envelope and the formation of a reed switch.

After the glass chuck 186 clamps the glass envelope in the position shown in FIG. 16A, the vacuum that had been holding glass envelope 22 in position on loader transfer arm 98 is turned off and air cylinder 182 is actuated to retract the transfer arm from the sealing area of the machine.

Figure 16B:
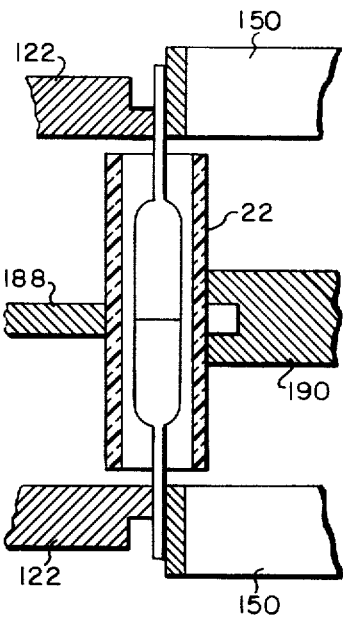

After withdrawal of the glass loader transfer arm 98, the upper and lower reedblade chuck assemblies which had been in their extreme upper and lower positions as shown in FIG. 16A, are now moved to their innermost stops on support post assembly 116 as shown in FIG. 16B. This movement causes the reed members 26 to reassume their original position as fixtured in bottom reedblade transfer fixture 38 and chuck 80. However, they are now positioned in this relationship inside of the glass envelope 22 which will enclose and support the completed reed switch 20.

After the reedblade chuck assemblies move together to the position shown in FIG. 16B, loader transfer arm assembly 34 is moved to the extreme left until the reedblade loader arm assembly 66 is again positioned over the bottom reedblade transfer fixture 38. In this position, the centerline 212 of the front infrared source 40 is in alignment with the machine main centerline 102. Cylinder 58 is then actuated to close the pressure assembly 36 against its seal, the chamber evacuated, purged and then pressurized with a dry gas. Then both front and rear infrared sources 40 and 42 are energized to effect sealing of the upper end of envelope 22 around the terminal shanks 24. The two energy sources are then switched to an "idle" mode and the infrared sources are moved downward on linear bearings 214 and 216 by the actions of their respective air cylinders (not shown). The two energy sources are then again energized to effect sealing of the lower end of reed switch 20.

Figure 16C:
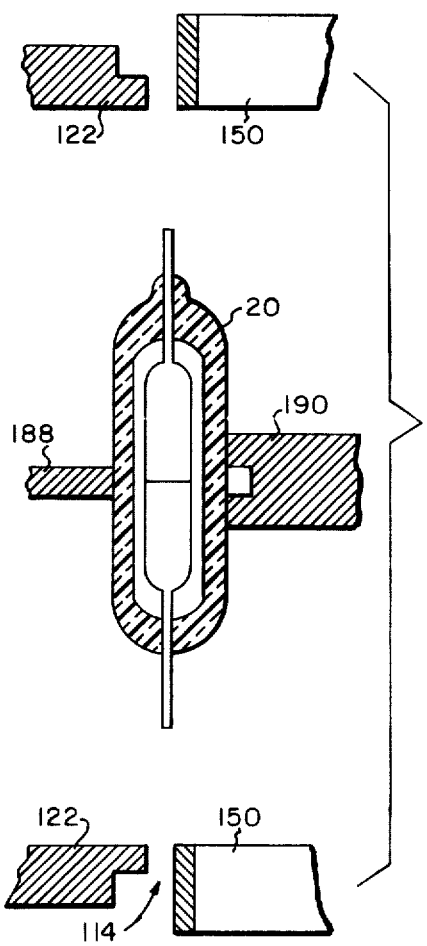

Following sealing of the lower end of reed switch 20, the energy sources are again switched to an "idle" mode. The pressure chamber is then exhausted of its atmosphere following which it opens moving up to the position shown in FIGS. 3 and 4. Upper and lower reedblade chuck assemblies then open and move outward to the positions shown in FIGS. 4 and 16C. The infrared sources are then moved to the upper sealing position by their respective air cylinders and the loader transfer arm support moves to its extreme right to complete the machine cycle. With the machine at rest the operator presses a button to open the glass chucks 186 and then removes the completed reed switch. The machine is then ready for initiation of another sealing cycle.

The foregoing verbal description of machine operation is shown graphically in FIG. 17 where 21 machine functions are described in terms of a series of 39 principal events. In FIG. 17, time increases from left to right for each of the 21 machine functions. Each of the principal events is illusrtated as a vertical change in the function line with the events being numbered E1, E2, etc. The five operator functions are: (1) start, (2) load the 4 bottom reed members, (3) load the 4 top reed members, (4) load the glass envelope and (5) operate pushbutton to open glass chucks and remove completed reed switch. These operator functions are shown in their proper time sequence at the bottom of the FIG. 17 graph.

Because they are conventional in nature, the details of the machine sequencing system and the pneumatic circuit for the many air cylinders have not been shown or described in detail. In machine embodiments constructed to date, sequencing has been accomplished by a timer motor which turns a cam shaft having cams for controlling the sequence of events for the 21 machine functions. Each cam on the cam shaft is so formed that it will close one or more electrical switches in the prescribed sequence. The switches, in turn, either directly control electrical events such as energizing of the infrared sources or, alternately, they control the solenoids used to actuate the valves which connect the various vacuum and pressure lines to the air cylinders and pressure chamber that comprise the machine's pneumatic circuit.

Since the multi-element reed capsule sealing apparatus of the present invention assemblies reed capsules having critical tolerances in the 1 to 5 thousandths range, certain portions of the apparatus are fabricated from metal alloys having low coefficients of thermal expansion in order to prevent misalignment of clamped parts due to thermal expansion of machine components while subjected to high temperatures during the sealing operation. It has been found desirable to fabricate the head base 54, support post assembly 116, upper and lower chuck assemblies 112 and 114, linear bearings 174 and glass chuck assembly 186 of alloy materials having a coefficient of thermal expansion on the order of 2 in./in./°F×10⁻⁷.

The invention has been described in detail herein with particular reference to preferred embodiments and features thereof. However, it will be understood that variations and modifications can be effected within the spirit and scope of the invention as described hereinabove and as defined in the appended claims.

What is claimed is:

1. Apparatus for aligning and transferring a plurality of reedblade switch contact members to be assembled into a reed capsule switch, comprising:

bottom reedblade transfer fixture means for aligning and temporarily holding reedblade contact members, said fixture means having one or more reedblade contact member receiving slots disposed about an axis and aligned with the desired assembled position of said contact members, one slot for each of the pairs of contact members in said reed capsule switch, reedblade loader arm means having an upper and a lower reedblade contact member receiving slot for each of the contact member pairs in said reed capsule switch, each of said upper and lower slots having a contact member receiving recess and one or more parts therein selectively connectable to a vacuum source and a source of pressurized air, said reedblade loader arm means being movable from a position where its slot axis is aligned with that of said bottom reedblade transfer fixture means to a position where it is not, movable hollow guide pin means within said bottom reedblade transfer fixture means, one for each slot therein and aligned therewith, said guide pin means being selectively movable between a retracted position wherein said slots are substantially flush with the edge of the slots and an extended position where said contact members extend above said slots a distance sufficient to partially enter the slots of said reedblade loader arm means aligned therewith, said hollow guide pin means being adapted to conduct air therethrough thereby to eject said contact members from the slots of said bottom reedblade transfer fixture means.

2. In a machine for assembling the plural reedblade contact pairs of a multi-element reed capsule switch interior of a glass envelope and having means for aligning said contact pairs to their desired assembled positions outside of their final assembly area, means for transferring said contact pairs and said glass envelope to said assembly area in said aligned positions and means for sealing said contact pairs into said glass envelope, the improvement in chucking means for holding the terminal shanks of each of the reedblade members in position during said sealing comprising:

reedblade chuck base means having one or more guide slots and a reedblade member receiving recess therein, one or more clamp pin means for each reedblade member to be assembled and located in said member receiving recess in alignment with said guide slots, one or more clamp slide means, one for each reedblade member to be assembled, said clamp slide means being located in said guide slots and reciprocable therein between a first position clamping said terminal shanks and a second position where said terminal shanks are unclamped, said terminal shanks being clamped between said clamp pin means and said clamp slide means when said clamp slide means are in said first position, selectively operable actuator means connected to each of said clamp slide means for effecting movement of said clamp slide means to said second position, spring means connected to each of said clamp slide means for biasing each of said clamp slide means toward said first position, and preloaded roller bearing means for each of said clamp slide means, said preloaded roller bearing comprising tubular rollers confined in a space less than the normal uncompressed diameter of said tubular rollers.

3. In a machine for assembling the plural reedblade contact pairs of a multi-element reed capsule switch interior of a glass envelope having means for aligning said contact pairs to their desired assembled positions outside of their final assembly area, means for transferring said contact pairs and said glass envelope to said assembly area in said aligned positions and means for sealing said contact pairs into said glass envelope, the improvement in chucking means for holding the terminal shanks of each of the reedblade members in position during said sealing comprising:

reedblade chuck base means having one or more guide slots and a reedblade member receiving recess therein, one or more clamp pin means one for each reedblade member to be assembled and located in said member receiving recess in alignment with said guide slots, one or more clamp slide means, one for each reedblade member to be assembled, said clamp slide means being located in said guide slots and reciprocable therein between a first position clamping said terminal shanks and a second position where said terminal shanks are unclamped, said terminal shanks being clamped between said clamp means and said clamp slide means when said clamp slide means are in said first position, selectively operable actuator means connected to each of said clamp slide means for effecting movement of said clamp slide means to said second position, (spring) means connected to each of said clamp slide means for biasing each of said clamp slide means toward said first position, and preloaded roller bearing means for each of said clamp slide means, said preloaded roller bearings comprising tubular rollers confined in a space less than the normal uncompressed diameter of said tubular rollers, said tubular rollers being on one side of said clamp slide means and conventional solid rollers being on the opposite side.

4. In a machine for assembling the plural reedblade contact pairs of a multi-element reed capsule switch interior of a glass envelope having means for aligning said contact pairs to their desired assembled positions outside of their final assembly area, means for transferring said contact pairs and said glass envelope to said assembly area in aligned position and means for sealing said contact pairs into said glass envelope, the improvement in chucking means for holding the terminal shanks of each of the reedblade members in position during said sealing comprising:

preloaded roller bearing means for preventing lateral movement of the terminal chuck holding means, said preloaded roller bearing comprising tubular rollers confined in a space less than the normal uncompressed diameter of said tubular rollers, said tubular rollers being on one side of said clamp slide means and conventional solid rollers being on the opposite side.

5. A method for assembling, aligning and transferring to a movable loader arm means in aligned position a plurality of reedblade switch contact members, comprising the steps of:

assembling said plurality of reedblades into slots in a bottom reedblade transfer fixture means, moving said loader arm means over said bottom reedblade transfer fixture means to a position where all of the bottom reedblade receiving slots of each means are aligned, moving each of said reedblades partly out of the slots in said bottom reedblade transfer fixture means and partly into said bottom reedblade receiving slots of said loader arm means, and pneumatically completing the movement of said reedblades out of the slots in said bottom reedblade transfer fixture means and into said bottom reedblade receiving slots of said loader arm.

6. A method for assembling, aligning and transferring to a movable loader arm means in aligned position a plurality of reedblade switch contact members comprising one or more reedblade switch contact pairs of a reed capsule switch, comprising the steps of:

assembling the reedblades comprising the first half of each of said contact pairs into slots in a bottom reedblade transfer fixture means, moving said loader arm means over said bottom reedblade transfer fixture means to a position where all of the bottom reedblade receiving slots of each means are aligned, assembling the reedblades comprising the other half of each of said contact pairs into upper reedblade receiving slots in said loader arm means, moving each of said reedblades comprising said first half partly out of the slots in said bottom reedblade transfer fixture means and partly into said bottom reedblade receiving slots of said loader arm means, and pneumatically completing the movement of said reedblades comprising said first half out of the slots in said bottom reedblade transfer fixture and into said bottom reedblade receiving slots of said loader arm whereby each of the reedblades comprising a contact pair is positioned in said loader arm means in the position it will occupy in the finished reed capsule switch.

7. A method for assembling and aligning a plurality of reedblade switch contact pairs of a reed capsule switch outside of the final assembly area of the switch and for transferring said contact pairs to said final assembly area in aligned condition, comprising the steps of:

assembling the reedblades comprising the first half of each of said contact pairs into slots in a bottom reedblade transfer fixture means, moving a loader arm means over said bottom reedblade transfer fixture means to a position where all of the bottom reedblade receiving slots of each means are aligned, assembling the reedblades comprising the other half of each of said contact pairs into upper reedblade receiving slots in each loader arm means, moving each of said reedblades comprising said first half partly out of the slots in said bottom reedblade transfer fixture means and partly into said bottom reedblade receiving slots of said loader arm means, pneumatically completing the movement of said reedblades comprising said first half out of the slots in said bottom reedblade transfer fixture and into said bottom reedblade receiving slots of said loader arm whereby each of the reedblades comprising a contact pair is positioned in said loader arm means about an axis and in the position it will occupy in the finished reed capsule switch, and moving said loader arm means to said final assembly area with its said contact pair axis being aligned with the axis of the reed capsule switch while it is being final assembled.

8. A method for assembling and aligning a plurality of reedblade switch contact pairs of a reed capsule switch outside of the final assembly area of the switch and for transferring said contact pairs to said final assembly area in aligned condition, comprising the steps of:

assembling the reedblades comprising the first half of each of said contact pairs into slots in a bottom reedblade transfer fixture means, moving a loader arm means over said bottom reedblade transfer fixture means to a position where all of the bottom reedblade receiving slots of each means are aligned, assembling the reedblades comprising the other half of each of said contact pairs into upper reedblade receiving slots in said loader arm means with their terminal shanks extending therefrom, moving each of said reedblades comprising said first half partly out of the slots in said bottom reedblade transfer fixture means and partly into said bottom reedblade receiving slots of said loader arm means, pneumatically completing the movement of said reedblades comprising said first half out of the slots in said bottom reedblade transfer fixture and into said bottom reedblade receiving slots of said loader arm whereby each of the reedblades comprising a contact pair is positioned in said loader arm means about an axis and in the position it will occupy in the finished reed capsule switch and with its terminal shanks extending from said loader arm, moving said loader arm means to said final assembly area with its said contact pair axis being aligned with the axis of the reed capsule switch while it is being final assembled, moving a lower reedblade chuck means into a position where the terminal shanks of the reedblades comprising said first half are each received in a slot in said lower reedblade chuck assembly, moving an upper reedblade chuck means into a position where the terminal shanks of said reedblades comprising said other half are each received in a slot in said upper reedblade chuck assembly, actuating said upper and lower reedblade chuck means to clamp each of said terminal shanks in its slot therein, moving said upper and said lower reedblade chuck means to disengage the reedblades from said loader arm means, and withdrawing said loader arm means from said final assembly area.

9. In the method for assembling, aligning and transferring reedblade switch contact pairs to a final assembly area in accord with claim 8, the additional steps of:

maintaining a vacuum on said reedblades while in said loader arm means until said upper and lower reedblade chuck means clamp the said terminal shanks, thereby to secure said reedblades in position until transfer to said chuck means, and applying a low pressure gas to said reedblades in place of said vacuum as they are disengaged from said loader arm means.

10. A method for assembling and aligning a plurality of reedblade switch contact pairs of a reed capsule switch outside of the final assembly area of the switch and for transferring said contact pairs and a glass envelope to said final assembly area in aligned condition, comprising the steps of:

assembling the reedblades comprising the first half of each of said contact pairs into slots in a bottom reedblade transfer fixture means, moving a loader arm means over said bottom reedblade transfer fixture means to a position where all of the bottom reedblade receiving slots of each means are aligned, assembling the reedblades comprising the other half of each of said contact pairs into upper reedblade receiving slots in said loader arm means with their terminal shanks extending therefrom, moving each of said reedblades comprising said first half partly out of the slots in said bottom reedblade transfer fixture means and partly into said bottom reedblade receiving slots of said loader arm means, pneumatically completing the movement of said reedblades comprising said first half out of the slots in said bottom reedblade transfer fixture and into said bottom reedblade receiving slots of said loader arm whereby each of the reedblades comprising a contact pair is positioned in said loader arm means about an axis and in the position it will occupy in the finished reed capsule switch and with its terminal shanks extending from said loader arm, moving said loader arm means to said final assembly area with its said contact pair axis being aligned with the axis of the reed capsule switch while it is being final assembled, moving a lower reedblade chuck means into a position where the terminal shanks of the reedblades comprising said first half are each received in a slot disposed about the axis of said lower reedblades chuck assembly, moving an upper reedblade chuck means into a position where the terminal shanks of said reedblades comprising said other half are each received in a slot disposed about the axis of said upper reedblade chuck assembly, actuating said upper and lower reedblade chuck means to clamp each of said terminal shanks in its slots therein, moving said upper and said lower reedblade chuck means to disengage the reedblades from said loader arm means, withdrawing said loader arm means from said final assembly area, assembling a glass envelope to a glass loader transfer arm means, moving said glass loader transfer arm means into said final assembly area to a position where the axis of said glass envelope coincides with the axis of said upper and lower reedblade chucks and the axis of a glass chuck, closing the jaws of said glass chuck to clamp said glass envelope in final assembly position, withdrawing said glass loader transfer arm from said assembly area, and moving said upper and said lower reedblade chuck means toward each other to a position where both halves of each contact pair are aligned with each other and in the position to be maintained in the finished reed capsule.

11. In a method for assembling the reedblade switch contact pairs and the glass envelope of a reed capsule switch in accord with claim 10, the additional step of:

applying infrared energy to said glass envelope to effect sealing of the reedblade contact pairs interior of said envelope with said terminal shanks extending therefrom.

12. In the method for assembling the reedblade switch contact pairs and the glass envelope of a reed capsule switch in accord with claim 11, the additional steps of:

actuating said upper and said lower reedblade chuck means to release the said terminal shanks, moving said upper and said lower reedblade chucks away from said assembled reed capsule switch to a position where the terminal shank receiving slots of said chucks are remote from said terminal shanks, and opening said jaws of said glass chuck to release said reed capsule switch.

* * * * *

UNITED STATES PATENT AND TRADEMARK OFFICE
CERTIFICATE OF CORRECTION

PATENT NO. : 3,941,575
DATED : MARCH 2, 1976
INVENTOR(S) : WAYNE E. NEESE

It is certified that error appears in the above-identified patent and that said Letters Patent are hereby corrected as shown below:

Column 9, line 67, after "means" insert -- one --

Column 12, line 10, delete "each" and insert -- said"

Signed and Sealed this eighteenth Day of May 1976

[SEAL]

Attest:

RUTH C. MASON
Attesting Officer

C. MARSHALL DANN
Commissioner of Patents and Trademarks